US007082459B2

(12) United States Patent
Kim et al.

(10) Patent No.: US 7,082,459 B2
(45) Date of Patent: Jul. 25, 2006

(54) SYSTEM AND METHOD FOR PROVIDING MULTIMEDIA ELECTRONIC MAIL SERVICE IN A PORTABLE TERMINAL

(75) Inventors: Soon-Jin Kim, Kumi-shi (KR); Young-Sik Park, Daegukwnagyashi (KR); Jung-Hoon Kim, Kumi-shi (KR)

(73) Assignee: Samsung Electronics Co., Ltd. (KR)

( * ) Notice: Subject to any disclaimer, the term of this patent is extended or adjusted under 35 U.S.C. 154(b) by 684 days.

(21) Appl. No.: 09/943,016

(22) Filed: Aug. 30, 2001

(65) Prior Publication Data
US 2002/0116465 A1 Aug. 22, 2002

(30) Foreign Application Priority Data
Feb. 19, 2001 (KR) ................... 2001-8147

(51) Int. Cl.
*G06F 15/16* (2006.01)
(52) U.S. Cl. ............ 709/206; 709/709; 709/217; 709/218; 709/219; 709/707; 709/104.1; 709/725; 709/143
(58) Field of Classification Search ............ 709/200, 709/203, 217–219, 222, 231, 204–207; 395/200.3; 455/566, 466; 725/131, 132; 707/104.1
See application file for complete search history.

(56) References Cited

U.S. PATENT DOCUMENTS 5,809,512 A 9/1998 Kato
6,049,831 A * 4/2000 Gardell et al. .............. 709/236
6,449,634 B1 * 9/2002 Capiel ....................... 709/206
6,549,612 B1 * 4/2003 Gifford et al. ............. 379/67.1
6,684,088 B1 * 1/2004 Halahmi ..................... 455/566
2001/0042100 A1 * 11/2001 Guedalia et al. ............ 709/206
2003/0191816 A1 * 10/2003 Landress et al. ............ 709/219

OTHER PUBLICATIONS

Chinese First Office Action dated Jul. 4, 2003, issued in a counterpart application, namely, Appln. No. 01140876.6.
"A Technical Solution of a Multimedia Serve in Computer Applications", *Computer Applications*, vol. 19, No. 2, Feb. 1999.

* cited by examiner

*Primary Examiner*—Jeffrey Pwu
(74) *Attorney, Agent, or Firm*—Dilworth & Barrese LLP

(57) ABSTRACT

A system and method for providing an E-mail service through a portable terminal with a wireless Internet access function. A multimedia server receives a multimedia E-mail including multimedia data and E-mail data to be transmitted to the portable terminal, stores the multimedia data in an internal local memory, and adds URL information as a predetermined format string to the E-mail content. An E-mail server receives the E-mail from the multimedia server and notifies the receiving portable terminal of the arrival of the E-mail. The portable terminal receives the E-mail from the E-mail server, parses the E-mail content, and displays the E-mail content with multimedia link information if the predetermined format string is confirmed.

9 Claims, 8 Drawing Sheets

SYSTEM AND METHOD FOR PROVIDING MULTIMEDIA ELECTRONIC MAIL SERVICE IN A PORTABLE TERMINAL

PRIORITY

This application claims priority to an application entitled "System and Method for Providing Multimedia Electronic Mail Service in Portable Terminal" filed in the Korean Industrial Property Office on Feb. 19, 2001 and assigned Serial No. 2001-8147, the contents of which are hereby incorporated by reference.

BACKGROUND OF THE INVENTION

1. Field of the Invention

The present invention relates generally to a portable terminal, and in particular, to a method and system for providing an electronic mail (E-mail) service to users through portable terminals having a wireless Internet access function.

2. Description of the Related Art

The rising demand for multimedia services increases interest in an E-mail service via a PC (personal Computer) in diverse forms such as a music mail, a picture card, an animation mail, and the like.

Meanwhile, portable terminals like PDAs (Personal Digital Assistants), smart phones, and mobile phones do no more than provide text information due to limitations in the data rate of a network and the performance of the processors, memories, and LCDs (Liquid Crystal Displays) of the terminals. Yet, with the advent of future mobile communication networks like CDMA 2000 (Code Division Multiple Access 2000), high rate data transmission is enabled and thus terminals supporting moving pictures can provide multimedia data transmission/reception.

One of the techniques of exchanging multimedia information between portable terminals is to automatically connect them to a predetermined server over the Internet wirelessly upon receipt of a periodical message or a particular message and download multimedia information. This technique is implemented by adapting such an application service as for a PC to a portable terminal. Therefore, the portable terminal needs a local memory for storing received multimedia data. A multimedia data file is usually several megabytes in length. To store this multimedia data file, a large capacity local memory is required, which a typical moving-picture terminal cannot afford. In addition, a multimedia transmission/reception service is needed aside from the general E-mail service.

SUMMARY OF THE INVENTION

It is, therefore, an object of the present invention to provide a system and method for providing a multimedia E-mail service by a general E-mail service without a local memory for storing received multimedia data.

The foregoing and other objects of the present invention are achieved by providing a system and method for providing an E-mail service through a portable terminal with a wireless Internet access function. A multimedia server receives a multimedia E-mail including multimedia data and E-mail data to be transmitted to the portable terminal, stores the multimedia data in an internal local memory, and adds URL information as a predetermined format string to the E-mail content. An E-mail server receives the E-mail from the multimedia server and notifies the receiving portable terminal of the arrival of the E-mail. The portable terminal receives the E-mail from the E-mail server, parses the E-mail content, and displays the E-mail content with multimedia link information if the predetermined format string is confirmed.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENT

A preferred embodiment of the present invention will be described herein below with reference to the accompanying drawings. In the following description, well-known functions or constructions are not described in detail since they would obscure the invention in unnecessary detail.

Figure 1:
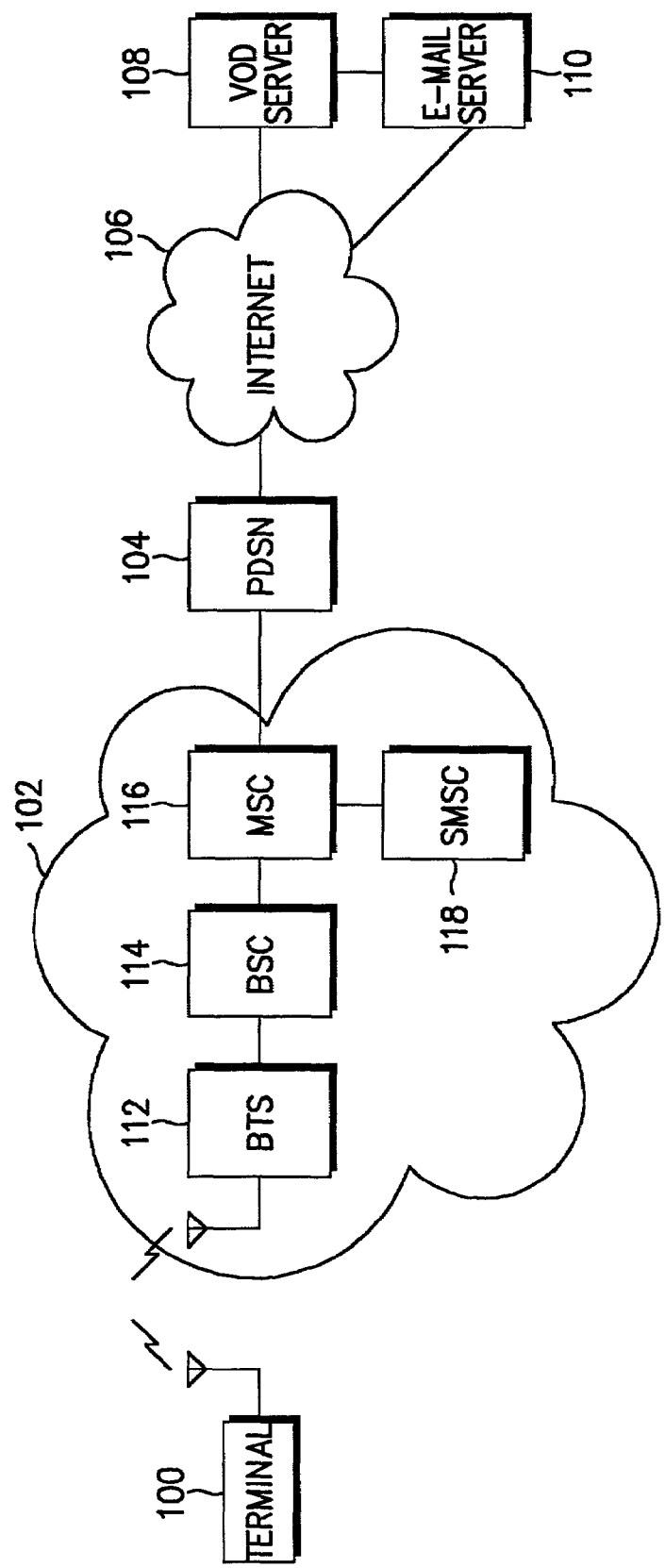
FIG. 1 illustrates a system architecture according to an embodiment of the present invention.

FIG. 1 illustrates system architecture according to an embodiment of the present invention. Referring to FIG. 1, a VOD (Video On Demand) server 108 is connected as a multimedia server to the Internet 106 and to an E-mail server 110 over a CDMA 2000 network in order to provide a multimedia E-mail service according to the present invention to users with E-mail IDs by a general E-mail service. A terminal 100 is a portable terminal having a video transmission/reception function and an Internet access function such as a PDA, a smart phone, and a mobile phone. The terminal 100 is connected to the Internet 106 via a mobile communication network 102 and a PDSN (Packet Data Serving Node) 104. An MSC (Mobile Switching Center) 116 is connected to an SMSC (Short Message Service Center) 118 in the mobile communication network 102. The VOD server 108 and the E-mail server 110 that are connected to the Internet 106 may be incorporated into one system or exist in separate systems.

Figure 2:
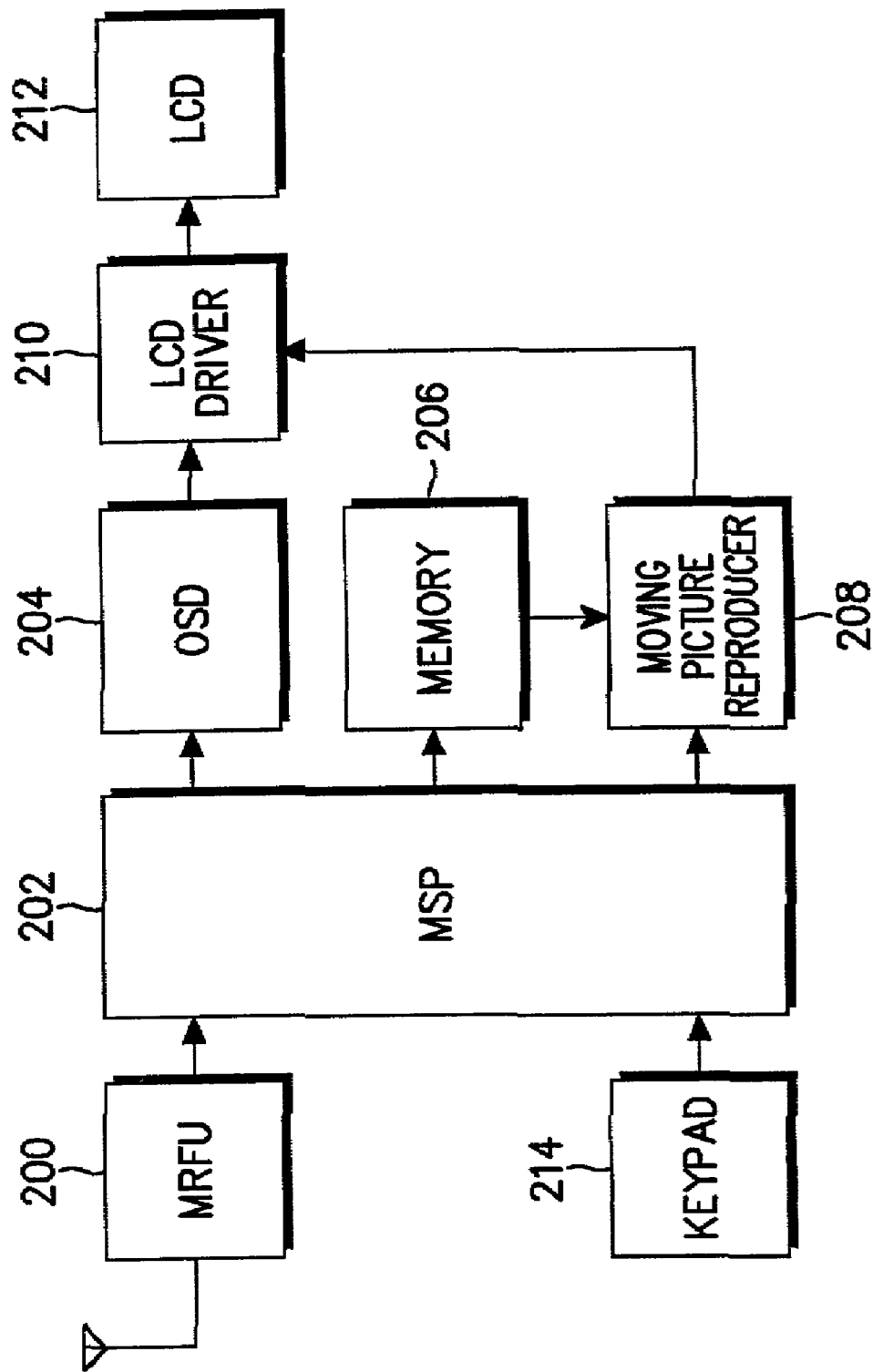
FIG. 2 is a block diagram of a portable terminal having a typical video transmission/reception function and an Internet access function.

FIG. 2 is a block diagram of the portable terminal 100 shown in FIG. 2. Referring to FIG. 2, an MRFU (Mobile Radio Frequency Unit) 200 receives a signal in a reception frequency band, converts the received analog signal to a digital signal, and feeds the digital signal to an MSP (Mobile Station Processor) 202. The MRFU 200 also converts a transmission digital signal to an analog signal, amplifies the power of the analog signal, and wirelessly transmits the amplified signal through an antenna. The MRFU 200 is divided into an RF module and a BBA (BaseBand Analog) module. The MSP 202 performs the video transmission/ reception function and the wireless Internet access function as well as typical functions related with a mobile terminal according to an input command or upon incoming of a call. The MSP 202 also analyzes a forward channel data message and reproduces an analog voice signal from the received data through demodulation, deinterleaving, decoding, signal processing, and vocoding, or performs the operation reversely. For example, the MSP 202 outputs a reproduced analog voice signal through a speaker, and converts an analog voice signal received from a microphone to a CDMA digital signal and transmits it on a reverse channel through the MRFU 200. In addition, the MSP 202 outputs data indicating operational states, messages, and character generation control data to an OSD (On Screen Display) 204. The OSD 204 generates an OSD video signal according to the character generation control data received from the MSP 202 and feeds the OSD video signal to an LCD driver 210. A moving picture reproducer 208 decodes video data received from the Internet 106 via the mobile communication network 102 and outputs the decoded video data to the LCD driver 210. The LCD driver 210 switches the received OSD video signal and the moving picture signal according to a predetermined operation mode best suited for the type of LCD 212 and outputs the switched signal to the LCD 212. A keypad 214 includes a plurality of digit keys and function keys and outputs key data to the MSP 202 by user manipulation.

Figure 3:
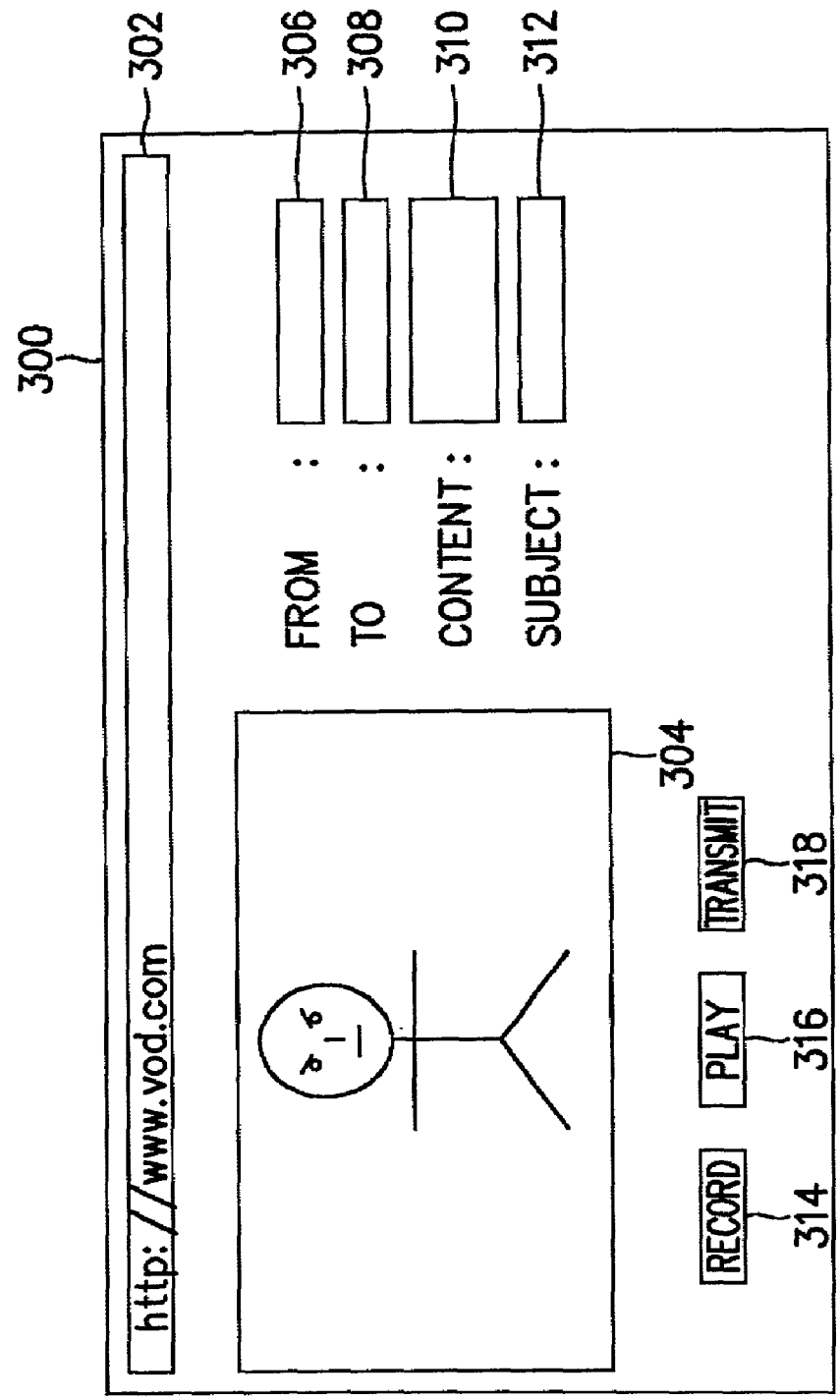
FIG. 3 illustrates an example of a multimedia E-mail window according to the present invention.
Figure 4A:
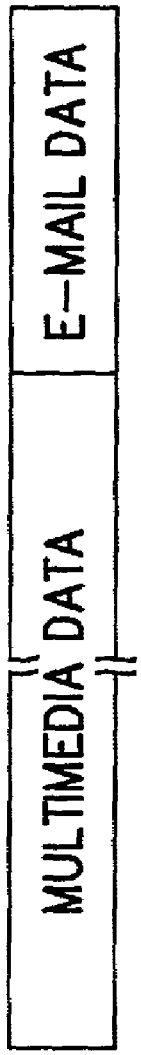
FIGS. 4A and 4B illustrate the format of a multimedia E-mail according to the embodiment of the present invention.

Meanwhile, a multimedia E-mail according to the present invention is comprised of multimedia data and E-mail data as shown in FIG. 4A. The multimedia E-mail can be made using a bi-directional moving picture terminal with a camera, a PC with a camera, or a multimedia E-mail only generator. An example of a multimedia E-mail window for generating a multimedia E-mail in a PC is shown in FIG. 3. The multimedia E-mail window 300 includes a window 302 for entering the Internet address of the VOD server 108 to receive a multimedia E-mail, a window 304 that displays an image when the image is transmitted, a transmitter information window 306, a receiver information entering window 208, a content window 310, a subject window 312, and icons 314 to 318 with which to select record, reproduce, and transmit.

The multimedia E-mail made using a PC or a portable terminal is transmitted to the VOD server 108 via the Internet 106. Then, the VOD server 108 stores only the multimedia data and transmits the E-mail data to the E-mail server 110.

Figure 4B:
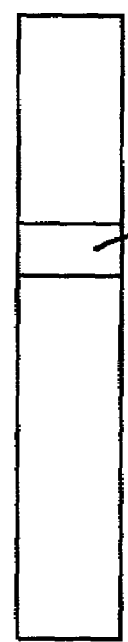
Figure 5:
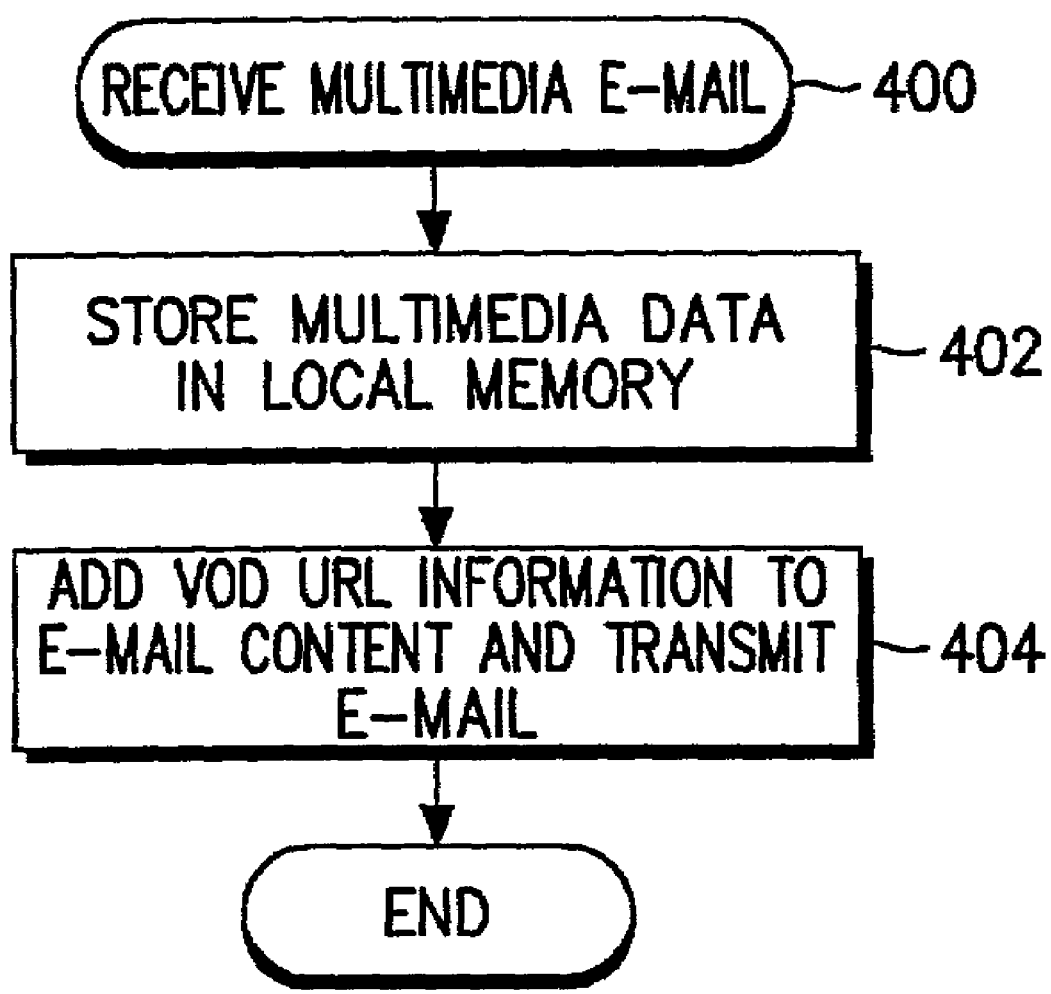
FIG. 5 is a flowchart illustrating an operation in a VOD server according to the present invention.

FIG. 5 illustrates the operation of the VOD server 108. Upon receipt of the multimedia E-mail in step 400, the VOD server 108 stores the multimedia data of a multimedia E-mail in an internal local memory in step 402. In step 404, the VOD server 108 adds VOD URL (Uniform Resource Locator) information as a string of a predetermined format to an E-mail content and transmits the E-mail to the E-mail server 110. As described later, the VOD URL information is added to the E-mail content so that a receiving portable terminal can access data stored in the VOD server 108. Therefore, the URL information has a particular format indicating multimedia data. For example, if URL information is http://www.vodservice.com/index001/voddata.vod, "http://" and "vod" at the end indicate that the URL information is associated with multimedia data. Thus, the E-mail transmitted to the E-mail server 110 has additionally VOD URL information as shown in FIG. 4B.

Upon receipt of the E-mail destined to a user with an ID registered in the E-mail server 110, the E-mail server 110 notifies the user of the arrival of the E-mail by an SMS. The E-mail server 110 processes the E-mail with VOD URL information as shown in FIG. 4B in the same manner as a typical E-mail and only the receiving portable terminal knows that the E-mail is a multimedia E-mail.

If the user has a portable terminal supporting a multimedia service and the portable terminal is provided with an E-mail application recognizing the particular format of an E-mail according to the present invention, the user can be connected to the E-mail server 110 via the portable terminal, read the E-mail, and be connected to the VOD server 108 for a multimedia service. If the portable terminal does not support the multimedia service, the user can read only the text of the E-mail content.

Figure 6:
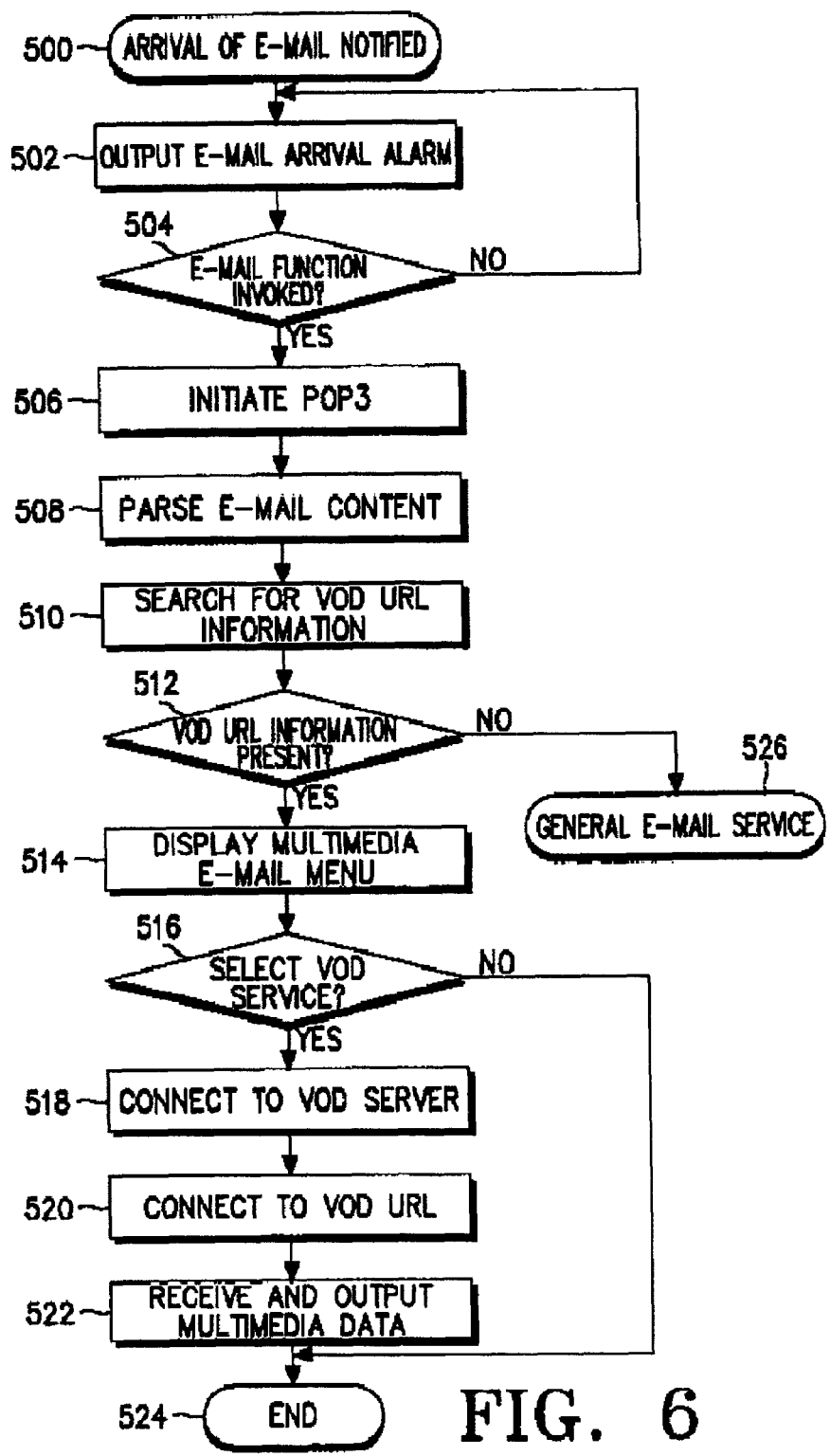
FIG. 6 is a flowchart illustrating an operation in a portable terminal according to the present invention.

FIG. 6 is a flowchart illustrating the operation of the MSP 202 according to a multimedia E-mail application of the portable terminal 100 according to the embodiment of the present invention. Referring to FIG. 6, upon receipt of an E-mail arrival message by the SMS in step 500, the MSP 202 outputs an E-mail arrival alarm audibly and/or visibly in the same manner as when a general E-mail arrives in step 502, and waits for a user to invoke an E-mail function in step 504.

Figure 7A:
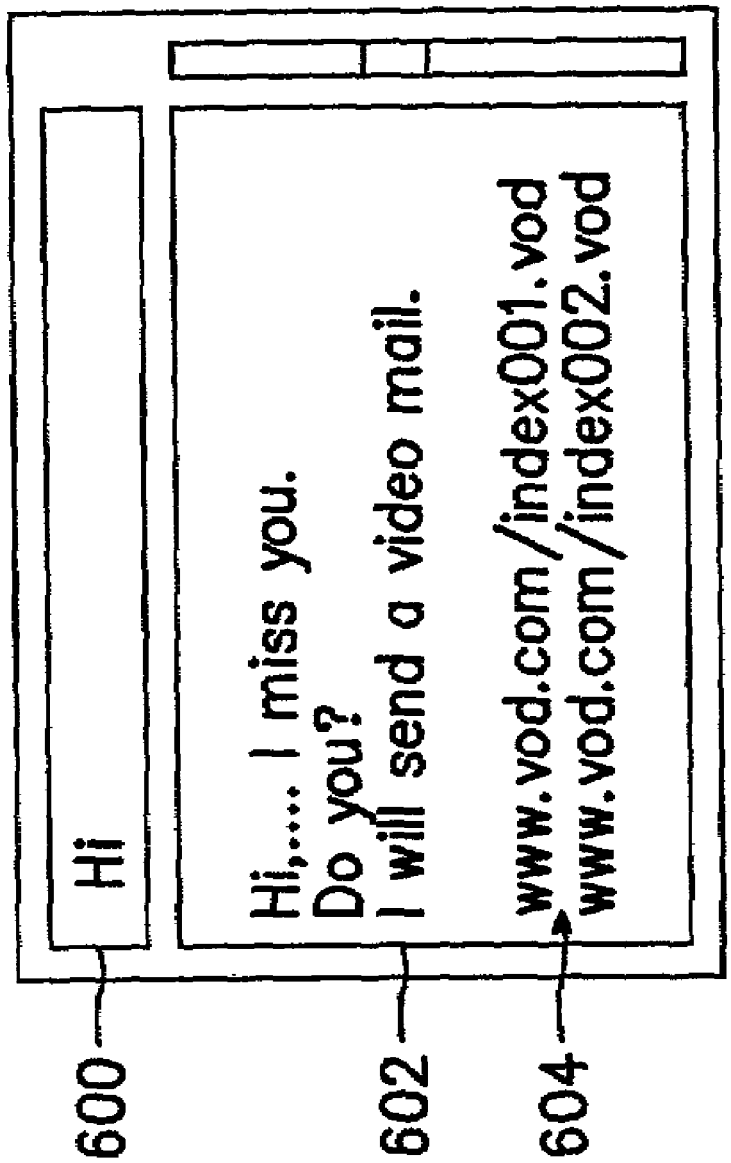
FIGS. 7A and 7B illustrate examples of a multimedia E-mail menu according to the embodiment of the present invention.
Figure 7B:
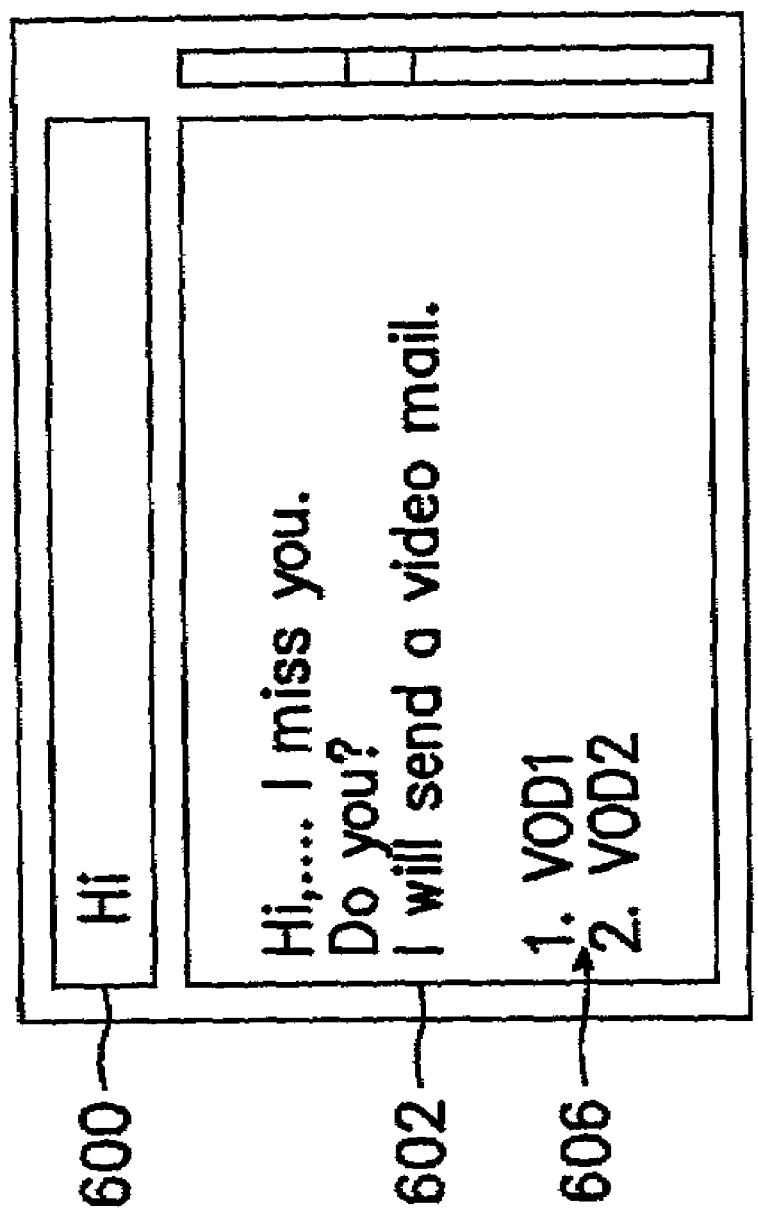

If the E-mail function is invoked, the MSP 202 initiates a POP3 (Post Office Protocol) procedure as it does when a general E-mail is received in step 506. By the POP3 the MSP 202 reads corresponding E-mail information from the E-mail server 110. In steps 508 to 512, the MSP 202 parses the content of the E-mail, reads out the E-mail from the E-mail server 110 by the POP3 being an E-mail reading protocol, classifies the subject, sending time, and transmitter of the E-mail, and determines whether there is a predetermined string indicating VOD URL information being multimedia link information in the E-mail content. If the string, that is, the link information, does not exist, this implies that the E-mail is not a multimedia E-mail. Thus, the MSP 202 provides a general E-mail service in step 526. Otherwise, the MSP 202 displays a multimedia E-mail menu on the LCD 212 so that the user may select a VOD service, a multimedia service, in step 514. The multimedia E-mail menu can be made as shown in FIGS. 7A and 7B. In FIGS. 7A and 7B, reference numeral 600 denotes a window for displaying a subject entered in the window 312 shown in FIG. 3, reference numeral 602 denotes an E-mail content, reference numeral 604 denotes VOD URL information, and reference numeral 606 denotes menu items corresponding the VOD URL information. In FIG. 7A, the link information is incorporated in the E-mail content. Here, to discriminate the link information from the content, a different font can be used. In FIG. 7B, the link information is given as selectable menu items.

In this state, if the user wants to receive multimedia data, he selects the link information directly in the display shown in FIG. 7A or menu items 1 or 2 in the display shown in FIG. 7B. When the user selects the VOD service in step 516, the MSP 202 is connected to the VOD server 108 in step 518 and then to the VOD URL in step 520. The portable terminal 100 receives multimedia data in a streaming file format, reproduces the multimedia data, and outputs the reproduced data in step 522. The streaming of the multimedia data allows the portable terminal to reproduce the data without storing it. Streaming refers to direct reproduction of received data without storing it in a local memory. The streaming follows the ISO/IEC MPEG-4 intermedia file format.

Therefore, arrivals of multimedia mail and link information are notified to a terminal user by a general E-mail service and multimedia is transmitted to the user utilizing streaming multimedia. Consequently, there is no need for a local memory, voice and pictures. Also, texts can be exchanged by transmitting a mail including multimedia data such as audio data, video data, and text messages.

While the invention has been shown and described with reference to a certain preferred embodiment thereof, it is a mere exemplary application. Even though the embodiment of the present invention was described in relation to transmission of video data, it is also applicable to multimedia data. Therefore, it will be understood by those skilled in the art that various changes in form and details may be made therein without departing from the spirit and scope of the invention as defined by the appended claims.

What is claimed is:

1. A system for providing an E-mail service through a portable terminal with a wireless Internet access function, comprising:
   a multimedia server for receiving a multimedia E-mail message including multimedia data and E-mail data to be transmitted to the portable terminal, and after receiving the E-mail message, removing the multimedia data from the E-mail message, storing the multimedia data in an internal local memory, and adding uniform resource locator (URL) information of a server on which multimedia data is stored as a predetermined format string to the E-mail message;
   an E-mail server for receiving the E-mail message from the multimedia server and notifying the receiving portable terminal of the arrival of the E-mail message; and
   the portable terminal for receiving the E-mail message from the E-mail server, parsing the E-mail message, and displaying the E-mail message with multimedia link information if the predetermined format string is confirmed, wherein an E-mail recipient can access data stored in a VOD server by selecting the multimedia link information from within an opened E-mail.

2. The system of claim 1, wherein upon request for the multimedia data stored in the multimedia server, the multimedia data is transmitted in a streaming file format and if a user of the portable terminal selects a multimedia service, the portable terminal is connected to the multimedia server and then to a multimedia URL, and receives, reproduces, and outputs the multimedia data.

3. The system of claim 2, wherein the multimedia server is a VOD server.

4. A method of providing an E-mail service through a portable terminal with a wireless Internet access function in a system having a multimedia server and an E-mail server connected to the Internet, comprising the steps of:
   receiving a multimedia E-mail message including multimedia data and E-mail data to be transmitted to the portable terminal, and after receiving the E-mail message, removing the multimedia data from the E-mail message, storing the multimedia data in an internal local memory, adding uniform resource locator (URL) information of a server on which multimedia data is stored as a predetermined format string to the E-mail message, and transmitting the E-mail message to the E-mail server in the multimedia server;
   receiving the E-mail message from the multimedia server and notifying the receiving portable terminal of arrival of the E-mail message in the E-mail server; and
   receiving the E-mail message from the E-mail server, parsing the E-mail message, and displaying the E-mail message with multimedia link information if the predetermined format string is confirmed in the portable terminal, wherein an E-mail recipient can access data stored in a VOD server by selecting the multimedia link information from within an opened E-mail.

5. The method of claim 4, further comprising the steps of:
   transmitting the multimedia data in a streaming file format upon requesting the multimedia data stored in the multimedia server; and
   connecting the portable terminal to the multimedia server and then to a multimedia URL, and receiving, reproducing, and outputting the multimedia data in the portable terminal if a user of the portable terminal selects a multimedia service.

6. The method of claim 5, wherein the multimedia server is a VOD server.

7. A method of providing an E-mail service in a portable terminal with a wireless Internet access function, comprising the steps of:
   receiving an E-mail message from a multimedia server if arrival of the E-mail is notified and an E-mail function is invoked;
   determining whether the received E-mail message contains link information including a predetermined format string; and
   displaying the E-mail message with multimedia link information including uniform resource locator (URL) information of server on which multimedia data is stored, if it is determined that the link information includes the predetermined format string, wherein an E-mail recipient can access data stored in a VOD server by selecting the multimedia link information from within an opened E-mail.

8. The method of claim 7, further comprising the step of connecting to the multimedia server and then to a multimedia URL, and receiving, reproducing, and outputting multimedia data in a streaming file format if a user of the portable terminal selects a multimedia service.

9. The method of claim 8, wherein the multimedia server is a VOD server.

* * * * *